United States Patent
Alexander et al.

(10) Patent No.: US 10,365,928 B2
(45) Date of Patent: Jul. 30, 2019

(54) SUPPRESS UNNECESSARY MAPPING FOR SCRATCH REGISTER

(71) Applicant: International Business Machines Corporation, Armonk, NY (US)

(72) Inventors: Gregory W. Alexander, Pflugerville, TX (US); David S. Hutton, Leon, FL (US); Christian Jacobi, West Park, NY (US); Edward T. Malley, New Rochelle, NY (US); Anthony Saporito, Highland, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 40 days.

(21) Appl. No.: 15/800,321

(22) Filed: Nov. 1, 2017

(65) Prior Publication Data
US 2019/0129717 A1    May 2, 2019

(51) Int. Cl.
*G06F 9/38* (2018.01)
*G06F 9/30* (2018.01)

(52) U.S. Cl.
CPC .......... *G06F 9/3013* (2013.01); *G06F 9/3016* (2013.01); *G06F 9/30181* (2013.01); *G06F 9/384* (2013.01); *G06F 9/3838* (2013.01); *G06F 9/3857* (2013.01)

(58) Field of Classification Search
CPC ....... G06F 9/384; G06F 9/3838; G06F 9/3857
See application file for complete search history.

(56) References Cited

U.S. PATENT DOCUMENTS

| | | | | |
|---|---|---|---|---|
| 6,311,267 B1 * | 10/2001 | Nguyen | ................ | G06F 9/3836 712/217 |
| 7,809,930 B2 * | 10/2010 | Piry | .................... | G06F 9/30072 712/217 |
| 8,683,180 B2 | 3/2014 | Barrick et al. | | |
| 2001/0004755 A1 * | 6/2001 | Levy | ................... | G06F 9/30076 712/217 |
| 2002/0144090 A1 * | 10/2002 | Ronen | ..................... | G06F 9/384 712/217 |
| 2004/0215944 A1 | 10/2004 | Burky et al. | | |
| 2004/0216105 A1 | 10/2004 | Burky et al. | | |

(Continued)

OTHER PUBLICATIONS

Eduardo Quinones et al., Early Register Release for Out-of-Order Processors with Register Windows, IEEE, p. 1-10 (Year: 2007).*

(Continued)

*Primary Examiner* — Jyoti Mehta
(74) *Attorney, Agent, or Firm* — Cantor Colburn LLP; William Kinnaman (57) ABSTRACT

Embodiments of the invention are directed to methods for handling scratch registers in a processor. The method includes receiving a cracked instruction in an instruction dispatch unit of the processor. The method further includes decoding the cracked instruction into a group of micro-operations. Based on a determination that the instruction group uses a scratch register, determining if the scratch register is used in other groups of micro-operations. Based on a determination that the scratch register is not used in other instruction groups, allocating a physical register for use as the scratch register without creating a mapper entry for the scratch register.

17 Claims, 5 Drawing Sheets

(56) References Cited

U.S. PATENT DOCUMENTS

| | | | |
|---|---|---|---|
| 2007/0234011 A1* | 10/2007 | Abernathy | G06F 9/3004 |
| | | | 712/217 |
| 2008/0016324 A1 | 1/2008 | Burky et al. | |
| 2008/0177983 A1 | 7/2008 | Piry et al. | |
| 2011/0202747 A1* | 8/2011 | Busaba | G06F 9/30032 |
| | | | 712/204 |
| 2012/0005444 A1* | 1/2012 | Rupley | G06F 9/384 |
| | | | 711/166 |
| 2014/0289501 A1* | 9/2014 | Schon | G06F 9/384 |
| | | | 712/217 |
| 2016/0266901 A1* | 9/2016 | Winkel | G06F 9/3838 |
| 2018/0004524 A1* | 1/2018 | Mekkat | G06F 9/384 |

OTHER PUBLICATIONS

Sparsh Mittal, A Survey of Techniques for Designing and Managing CPU Register File, Published onlein in Wiley InterScience (www.interscience.wiley.com), p. 11-18 (Year: 2016).*

Buti et al., "Organization and implementation of the register-renaming mapper for out-of-order IBM POWER4 processors", IBM J. Res. & Dev. vol. 49 No. 1 Jan. 2005; pp. 167-188.

* cited by examiner

```
STAM un1 SGR1 <- AR0
STAM un2 SGR2 <- AR1
STAM un3 64b Store(SGR1(32:63) & SGR2(32:63))
```

SUPPRESS UNNECESSARY MAPPING FOR SCRATCH REGISTER

BACKGROUND

The present invention relates in general to the field of computing. More specifically, the present invention relates to systems and methodologies for improving the performance of a processor's handling of internal registers.

An Out of Order ("OoO") processor typically contains multiple execution pipelines that may opportunistically execute instructions in a different order than what the program sequence (or "program order") specifies in order to maximize the average instruction per cycle rate by reducing data dependencies and maximizing utilization of the execution pipelines allocated for various instruction types. Results of instruction execution are typically held temporarily in the physical registers of one or more register files of limited depth. Registers are quickly accessible locations internal to a central processing unit. In a processor that uses registers, data is loaded from a larger memory, such as a main memory or a cache, where it is used for arithmetic operations or other manipulations by machine instructions. An OoO processor typically employs register renaming to avoid unnecessary serialization of instructions due to the reuse of a given architected register by subsequent instructions in the program order.

Under register renaming operations, each architected (i.e., logical) register targeted by an instruction is mapped to a unique physical register in a register file. In current high-performance OoO processors, a unified main mapper is utilized to manage the physical registers within multiple register files while the instructions that write them are being processed. A secondary architected mapper manages the physical registers after they have completed. In addition to storing the logical-to-physical register translation (i.e., in mapper entries), the unified main mapper is also responsible for storing dependency data (i.e., queue position data), which is important for instruction ordering upon completion.

In a unified main mapper-based renaming scheme, it is desirable to free mapper entries as soon as possible for reuse by the OoO processor. However, in the prior art, a unified main mapper entry cannot be freed until the instruction that writes to a register mapped by the mapper entry is completed. This constraint is enforced because, until completion, there is a possibility that an instruction that has "finished" (i.e., the particular execution unit (EU) has successfully executed the instruction) will still be flushed before the instruction can "complete" and before the architected, coherent state of the registers is updated. Because of the small number of registers available to a processor, an efficient way of managing the use of registers is desirable.

SUMMARY

Embodiments of the invention are directed to methods for handling scratch registers in a processor. The method includes receiving a cracked instruction in an instruction dispatch unit of the processor. The method further includes decoding the cracked instruction into one or more groups of micro-operations. Based on a determination that the one or more instruction groups use a scratch register, determining if the scratch register is used in subsequent groups of micro-operations. Based on a determination that the scratch register is not used in subsequent instruction groups, allocating a physical register for use as the scratch register without creating a mapper entry for the scratch register.

Embodiments of the present invention are further directed to a processor. The processor includes a dispatch unit from which instructions are dispatched; instruction processing circuitry; a plurality of physical register files; and a mapper. The dispatch unit is configured to: receiving a cracked instruction in an instruction dispatch unit of the processor. The method further includes decoding the cracked instruction into one or more groups of micro-operations. Based on a determination that the instruction group uses a scratch register, determining if the scratch register is used in subsequent groups of micro-operations. Based on a determination that the scratch register is not used in subsequent instruction groups, allocating a physical register for use as the scratch register without creating a mapper entry for the scratch register.

Embodiments of the invention are directed to methods for handling scratch registers in a processor. The method includes receiving a group of micro-operations in an instruction dispatch unit of the processor, wherein the group of micro-operations comprises an instruction expanded into the plurality of groups of micro-operations. The method further includes based on a determination that the instruction group uses a scratch register, determining if the scratch register is used in subsequent groups of micro-operations. The method further includes based on a determination that the scratch register is not used in subsequent instruction groups, allocating a physical register for use as the scratch register without creating a mapper entry for the scratch register.

Additional features and advantages are realized through techniques described herein. Other embodiments and aspects are described in detail herein. For a better understanding, refer to the description and to the drawings.

BRIEF DESCRIPTION OF THE DRAWINGS

The subject matter that is regarded as embodiments is particularly pointed out and distinctly claimed in the claims at the conclusion of the specification. The foregoing and other features and advantages of the embodiments are apparent from the following detailed description taken in conjunction with the accompanying drawings in which:

DETAILED DESCRIPTION

Various embodiments of the present invention will now be described with reference to the related drawings. Alternate embodiments can be devised without departing from the scope of this invention. Various connections might be set forth between elements in the following description and in the drawings. These connections, unless specified otherwise, can be direct or indirect, and the present description is not intended to be limiting in this respect. Accordingly, a coupling of entities can refer to either a direct or an indirect connection.

Additionally, although a detailed description of a computing device is presented, configuration and implementation of the teachings recited herein are not limited to a particular type or configuration of computing device(s). Rather, embodiments are capable of being implemented in conjunction with any other type or configuration of wireless or non-wireless computing devices and/or computing environments, now known or later developed.

Furthermore, although a detailed description of usage with specific devices is included herein, implementation of the teachings recited herein are not limited to embodiments described herein. Rather, embodiments are capable of being implemented in conjunction with any other type of electronic device, now known or later developed.

At least the features and combinations of features described in the present application, including the corresponding features and combinations of features depicted in the figures amount to significantly more than implementing a method of managing registers. Additionally, at least the features and combinations of features described in the immediately following paragraphs, including the corresponding features and combinations of features depicted in the figures go beyond what is well understood, routine and conventional in the relevant field(s).

Figure 1:
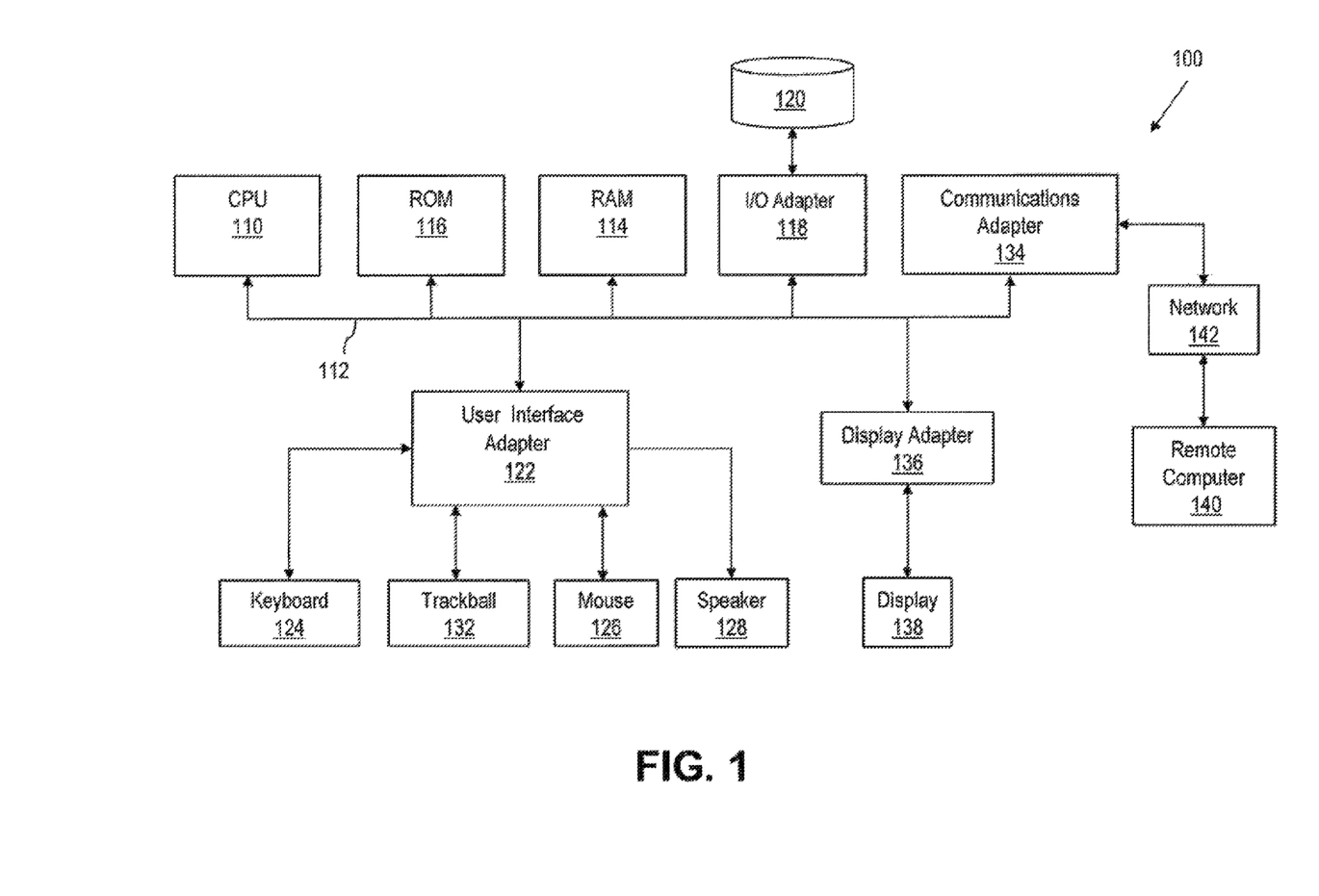
FIG. 1 is a high-level block diagram of an exemplary data processing system in accordance with one or more embodiments of the present invention.

With reference now to the figures, and in particular to FIG. 1, an example is shown of a data processing system 100 which may include an OoO processor employing an intermediate register mapper as described below with reference to FIG. 2. As shown in FIG. 1, data processing system 100 has a central processing unit (CPU) 110, which may be implemented with processor 200 of FIG. 2. CPU 110 is coupled to various other components by an interconnect 112. Read only memory ("ROM") 116 is coupled to the interconnect 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a storage device 120. Communications adapter 134 interfaces interconnect 112 with network 140, which enables data processing system 100 to communicate with other such systems, such as remote computer 140. Input/Output devices are also connected to interconnect 112 via user interface adapter 122 and display adapter 136. Keyboard 124, track ball 132, mouse 126 and speaker 128 are all interconnected to bus 112 via user interface adapter 122. Display 138 is connected to system bus 112 by display adapter 136. In this manner, data processing system 100 receives input, for example, throughout keyboard 124, track ball 132, and/or mouse 126 and provides an output, for example, via network 142, on storage device 120, speaker 128 and/or display 138. The hardware elements depicted in data processing system 100 are not intended to be exhaustive, but rather represent principal components of a data processing system in one embodiment.

The operation of data processing system 100 can be controlled by program code, such as firmware and/or software, which typically includes, for example, an operating system such as AIX ("AIX" is a trademark of the IBM Corporation) and one or more application or middleware programs. Such program code comprises instructions discussed below with reference to FIG. 2.

Figure 2:
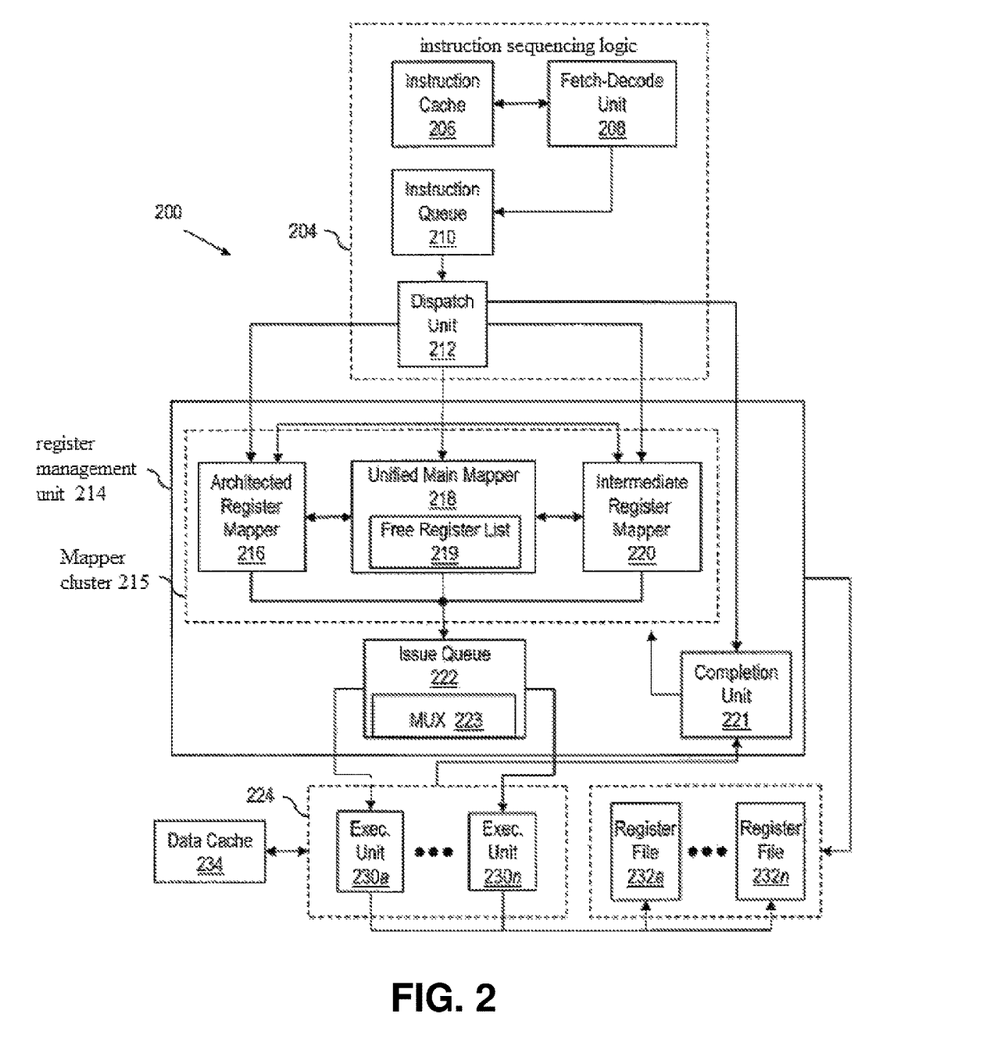
FIG. 2 is a high-level block diagram of an exemplary processor in accordance with one or more embodiments of the invention.

Referring now to FIG. 2, there is depicted a superscalar processor 200 according to the principles of the present invention. Instructions are retrieved from memory (e.g., RAM 114 of FIG. 1) and loaded into instruction sequencing logic (ISL) 204, which includes Level 1 Instruction cache (L1 I-cache) 206, fetch-decode unit 208, instruction queue 210 and dispatch unit 212. Specifically, the instructions are loaded in L1 I-cache 206 of ISL 204. The instructions are retained in L1 I-cache 206 until they are required, or replaced if they are not needed. Instructions are retrieved from L1 I-cache 206 and decoded by fetch-decode unit 208. After decoding a current instruction, the current instruction is loaded into instruction queue 210. Dispatch unit 212 dispatches instructions from instruction queue 210 into register management unit 214 (also known as an instruction sequencing unit), as well as completion unit 221. Completion unit 221 is coupled to general execution unit 224 and mapper cluster 215, and monitors when an issued instruction has completed.

When dispatch unit 212 dispatches a current instruction, unified main mapper 218 of register management unit 214 allocates and maps a destination logical register number to a physical register within physical register files 232a-232n that is not currently assigned to a logical register. The destination is said to be renamed to the designated physical register among physical register files 232a-232n. Unified main mapper 218 removes the assigned physical register from a list 219 of free physical registers stored within unified main mapper 218. All subsequent references to that destination logical register will point to the same physical register until fetch-decode unit 208 decodes another instruction that writes to the same logical register. Then, unified main mapper 218 renames the logical register to a different physical location selected from free list 219, and the mapper is updated to enter the new logical-to-physical register mapper data. When the logical-to-physical register mapper data is no longer needed, the physical registers of old mappings are returned to free list 219. If free physical register list 219 does not have enough physical registers, dispatch unit 212 suspends instruction dispatch until the needed physical registers become available.

After the register management unit 214 has mapped the current instruction, issue queue 222 issues the current instruction to the general execution engine 224, which includes execution units (EUs) 230a-230n. Execution units 230a-230n are of various types, such as floating-point (FP), fixed-point (FX), and load/store (LS). General execution engine 224 exchanges data with data memory (e.g., RAM 114, ROM 116 of FIG. 1) via a data cache 234. Moreover, issue queue 222 may contain instructions of FP type, FX type, and LS instructions. However, it should be appreciated that the invention is not limited in this regard, and any number and types of instructions can be used. During execution, EUs 230a-230n obtain the source operand values from physical locations in register file 232a-232n and store result data, if any, in register files 232a-232n and/or data cache 234.

Still referring to FIG. 2, register management unit 214 includes (i) mapper cluster 215, which includes architected register mapper 216, unified main mapper 218, intermediate register mapper 220, and (ii) issue queue 222. Mapper cluster 215 tracks the physical registers assigned to the logical registers of various instructions. In an exemplary embodiment, architected register mapper 216 has 16 logical (i.e., not physically mapped) registers of each type that store the last, valid (i.e., checkpointed) state of logical-to-physical register mapper data. However, it should be recognized that different processor architectures can have a different number of logical registers without limiting the scope of the invention. Architected register mapper 216 includes a pointer list that identifies a physical register that describes the checkpointed state. Physical register files 232a-232n will typically contain more registers than the number of entries in architected register mapper 216. It should be noted that the particular number of physical and logical registers that are used in a renaming mapping scheme can vary and the invention is not limited in this regard.

Unified main mapper 218 facilitates tracking of the transient state of logical-to-physical register mappings. The term "transient" refers to the fact that unified main mapper 218 keeps track of tentative logical-to-physical register mapping data as the instructions are executed out-of-order. OoO execution typically occurs when there are older instructions which would take longer (i.e., make use of more clock cycles) to execute than newer instructions in the pipeline. However, should an OoO instruction's executed result require that it be flushed for a particular reason (e.g., a branch misprediction), the processor can revert to the checkpointed state maintained by architected register mapper 216 and resume execution from the last, valid state. In some embodiments, it is also possible to revert to a state between the checkpointed state and the current state by flushing a subset of the entries in the unified main mapper 218.

Unified main mapper 218 makes the association between physical registers in physical register files 232a-232n and architected register mapper 216. The qualifying term "unified" refers to the fact that unified main mapper 218 obviates the complexity of custom-designing a dedicated mapper for each of register files 232 (e.g., general-purpose registers (GPRs), floating-point registers (FPRs), fixed-point registers (FXPs), exception registers (XERs), condition registers (CRs), etc.).

Within the transient, logical-to-physical register mapper entry of an OoO instruction, unified main mapper 218 also keeps track of dependency data (i.e., what instruction will write the register), which is important for instruction ordering. In some embodiments, this can be referred to as a scoreboard. Conventionally, once unified main mapper 218 has entered an instruction's logical-to-physical register translation, the instruction passes to issue queue 222. Issue queue 222 serves as the gatekeeper before the instruction is issued to execution unit 230 for execution. As a general rule, an instruction cannot leave issue queue 222 if it depends upon an older instruction that has not finished. For this reason, unified main mapper 218 tracks dependency data by storing the issue queue position data for each instruction that is mapped. Once the instruction has been executed by general execution engine 224, the instruction is said to have "finished" and is retired from issue queue 222.

Register management unit 214 may receive multiple instructions from dispatch unit 212 in a single cycle so as to maintain a filled, single issue pipeline. The dispatching of instructions is limited by the number of available entries in unified main mapper 218. Thus, dispatch unit 212 of a conventional mapper system can conceivably "dispatch" more instructions than what can actually be retired from unified main mapper 218. The reason for this bottleneck at the unified main mapper 218 is due to the fact that, conventionally, an instruction's mapper entry could not retire from unified main mapper 218 until the instruction "completed" (i.e., all older instructions have "finished" executing).

The concept of out of order execution will now be explained with a simplified example. In such a situation, if a computer program has a first set of instructions and a second set of instructions that have no data dependencies on each other, the first set and second set can be executed simultaneously in order to have the program execute faster. In such a situation, a limited number of registers can be problematic, so a process called register renaming is often used.

Figure 3A:
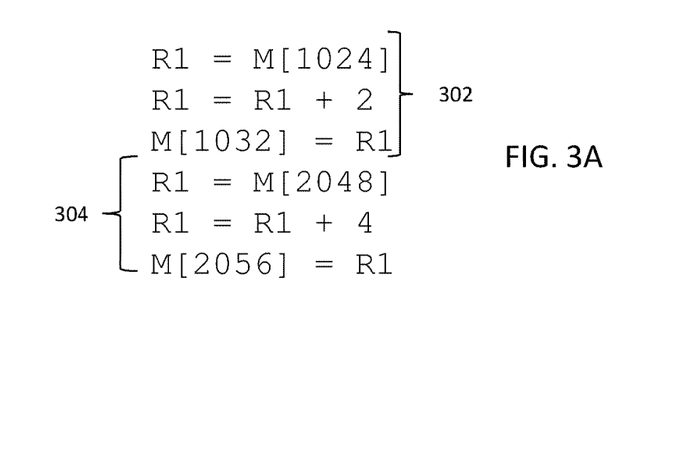
FIG. 3A is pseudocode presenting an example that utilizes registers.

Consider the pseudocode of FIG. 3A. There are six simple instructions presented here, that includes two three-line segments. The first set 302 of three instructions reads memory location 1024, increment the value by 2, then writes the result into memory location into memory location 1032. The second set 304 of three instructions reads memory location 2048, increment the value by 4, then writes the result into memory location 2056.

It can be readily seen that the first set of instructions has no data dependencies with the second set of instructions. Therefore, the two sets of instructions can be performed in parallel (simultaneously). However, as written in FIG. 3A, both the first set and the second set use a register named R1.

Figure 3B:
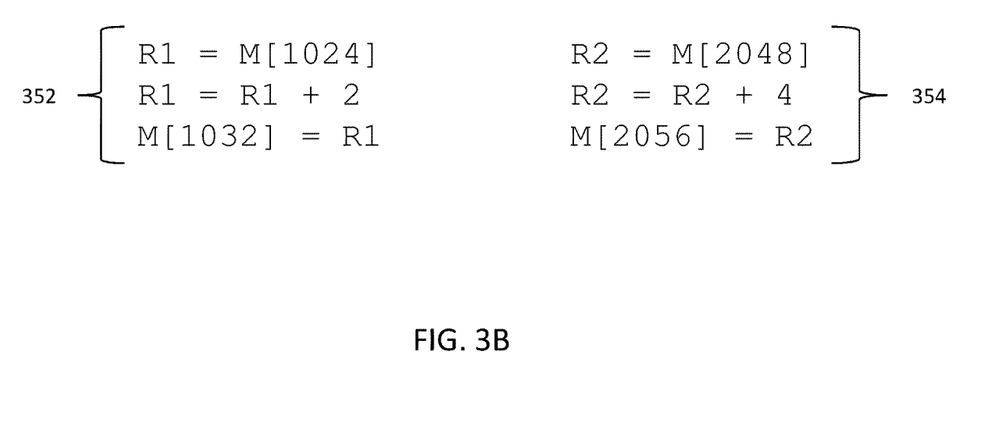
FIG. 3B is pseudocode presenting an example that employs register renaming.

FIG. 3B presents the same two set of instructions as above. In this case, first set 352 is executed simultaneously with second set 354. In order to avoid the situation where the same register R1 is being used in both sets of instructions, a concept called "register renaming" is being used in FIG. 3B. Here, all references to logical register R1 in second set 354 are automatically mapped to physical register R2. Because there are now no dependencies with either registers or memory locations, first set 352 and second set 354 can be executed simultaneously. In some embodiments, the same logical register (e.g., R1) can be used for both operations, with a different physical register being used for each operation. Thus, the instructions in FIG. 3B can be executed in less time that it would take the instructions in FIG. 3A to execute. In some embodiments, renaming can be internal, such that internal references to R1 and R2 are remapped using a mapper to an actual physical register.

Register renaming has limitations. Renaming typically uses one or more mappers, as described above with respect to FIG. 2, to track physical registers to "architected" registers.

The example given with respect to FIGS. 3A and 3B are with respect to a simple situation involving two registers and two sets of instructions. Modern processors can have multiple cores, each possibly capable of executing multiple threads. Such techniques can be combined with pipelining, where each instruction is split into a sequence of dependent steps such that different steps can be executed in parallel and instructions can be further processed concurrently (starting one instruction before finishing the previous instruction).

Whenever there is an instruction that updates an architected register, that architected register is mapped to a physical register location. Because there are a finite number of physical register locations, it is possible that the physical register file can become filled to capacity. In one exemplary processor, there are 128 physical registers. However, there are 144 possible instructions in flight at any moment. If each instruction in flight is using a different register, then it is possible that the number of registers required exceeds the number of physical registers. At such a point, there can be a stall in the execution of instructions until more unified mapper entries become available. This stall limits the performance of the processor.

In some central processing units, some operations can be cracked or expanded. In a cracked instruction, an instruction is broken up into a plurality of micro-operations (also known as micro-ops) for execution. If an instruction carries data from one micro op to another, a scratch register can be used. Scratch registers also must be mapped by the unified mapper, consuming a physical register and one of the unified main mapper entries. In an expanded instruction, a single complex instruction has multiple groups of micro-ops. Some instructions can have as many as sixteen or more groups of micro-ops, with each group containing up to three or more micro-ops.

There are several problems that can occur with respect to cracked and/or expanded instructions. For example, a scratch register takes up space. There has to be an allocation in the unified main mapper for the scratch register. In addition, a physical register that is being used as a scratch register can be occupied for a long time with respect to an expanded instruction. This is because an instruction with 16 groups of micro-ops can have a scratch register allocated for the first group, and it would remain allocated until the 16$^{th}$ group is completed. During that time period, the physical register is unable to be used for any other purpose. It would be desirable to more efficiently use the scratch registers.

Embodiments of the present invention address the above-described issues by using a novel method and system to handle scratch registers when used with micro-ops. If a scratch register will not survive a micro-ops set, then there is no need to map the register, thus saving a mapper entry.

Figure 4:
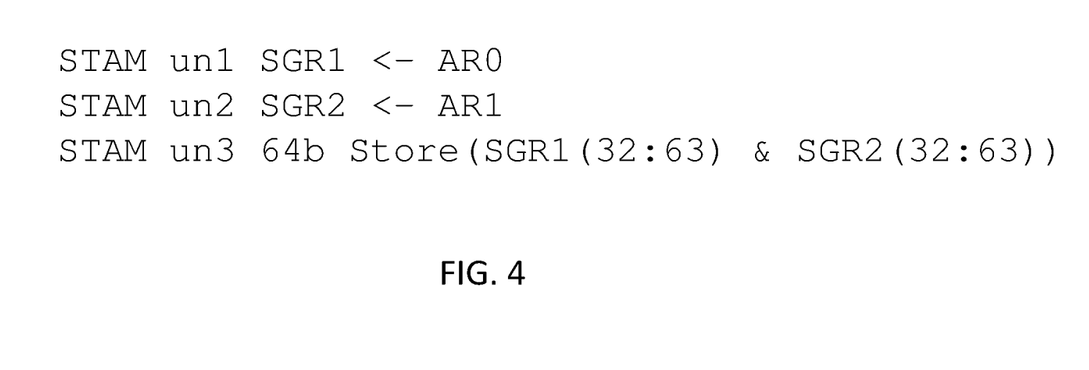
FIG. 4 depicts micro-ops of an exemplary cracked instruction.

To elaborate on cracked instructions, consider the example provided in FIG. 4. Illustrated in FIG. 4 are the micro-ops for an exemplary Store Multiple instruction. The Store Multiple instruction reads a range of 32 bit registers and writes them to memory in 64-bit chunks.

When broken into micro-ops, the result is as shown in FIG. 4. The Store Multiple instruction is broken or cracked into a triplet of micro-ops. The first micro-op copies one of the registers (AR0) into a scratch register (SGR1). The second micro-op copies another register (AR1) into another scratch register (SGR2). The third micro-op reads both the scratch registers (SGR1 and SGR2), concatenates the two, and writes the result to a memory location. Once those scratch registers are read by the third micro-op, there are no subsequent instructions that will need to read them again. In the case of instruction expansion, an additional situation can arise—a scratch register could be allocated early in the instruction (for example, in the first group of a multiple group instruction), and remains allocated for the remaining groups of the instruction, even if the scratch register is not used in any of the remaining groups.

Under previous systems, such a scratch register occupies resources because the in-flight mapper has to allocate an entry for the scratch register. In addition, for the case of the expansion instructions, the physical register is unusable for the entire duration of the expansion instruction because it is allocated for use as the scratch register.

In one or more embodiments of the present invention, because all of these instructions occupy the same group of micro-ops, the instruction dispatch unit 212 (IDU) reports that these scratch registers will not be needed later. Therefore, the main mapper 218 takes advantage of this bypass and does not create a mapping for the scratch registers SGR1 and SGR2.

In other words, instances where the scratch registers do not need to survive the triplet are identified in the instruction dispatch unit 212 and broadcast to the instruction sequence unit (ISU).

Figure 5:
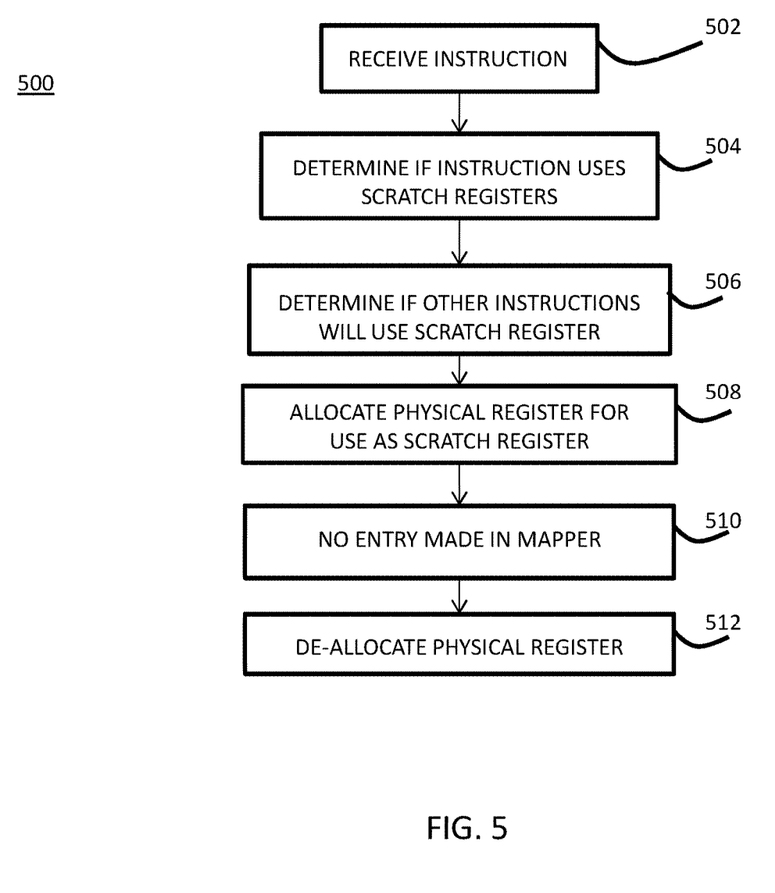
FIG. 5 is a flowchart illustrating the process of one or more embodiments.

A flowchart illustrating method 500 is presented in FIG. 5. Method 500 is merely exemplary and is not limited to the embodiments presented herein. Method 500 can be employed in many different embodiments or examples not specifically depicted or described herein. In some embodiments, the procedures, processes, and/or activities of method 500 can be performed in the order presented. In other embodiments, one or more of the procedures, processes, and/or activities of method 500 can be combined or skipped. In one or more embodiments, method 500 is performed by a processor as it is executing instructions.

An instruction is received in instruction dispatch unit (block 502). The instruction may be a cracked instruction that contains multiple micro-ops. The instruction may be an expanded instruction that includes multiple groups of micro-ops. The instruction is analyzed to determine if there are any scratch registers used by the instruction (block 504). If so, then the instruction is analyzed to determine if any future groups of instructions will need to access the scratch register (block 506). In the case of an expanded instruction, this analysis might only involve other groups of the expanded instruction. If the case of a cracked instruction, the type of instruction being used may be an indication that the contents of the register will not be used by other instructions (for example, a store instruction). For example, if the target scratch register of a first micro-op is consumed by a second micro-op in the same group and will not be consumed by any subsequent micro-op, that could be an indication that the target scratch register will not be used by further instruction groups. In some embodiments, the opcode of the instruction can determine if the scratch register is used in other instruction groups. In other words, certain instructions, by their nature, will not have dependent micro-ops in further instruction groups.

In some embodiments, the instruction data unit contains data that is split into triplets (IDA & IDB), each of which contains 3 pipes (one for each micro-op). Each pipe can contain one register target and up to 3 register sources. If the mapper observes that, for example, the target of IDA0 is being consumed by the source of IDA1, that physical mapping is bypassed within the triplet, rather than reading the unified main mapper. This information is broadcast to the mapper. In such a manner, the mapper is able to provide a source mapping to IDA1 without looking up the source in the main mapper. The mapper uses this information to decide whether or not to generate a new mapping for the scratch register. If the scratch register is not needed in a subsequent instruction, no mapping is generated. A mapper entry is saved, thus improving performance.

If the scratch register will not be used by subsequent instructions, a physical register is allocated for the scratch register (block 508). However, no entry is made in the unified main mapper (block 510). In its place, a pointer to the physical register can be placed in a group completion table. A group completion table is a data structure that contains information about micro-operation groups that is written at group dispatch and read at group completion. The group completion table stores a pointer to the physical register. Thus, when the scratch register is used, the group completion table is consulted to determine which physical register is being used. When the group of micro-operations completes, the group completion table can be read to determine the physical register that should be freed.

In some embodiments, groups within an expanded instruction can be completed before the instruction itself completes. This is called group completion. The expanded instruction is considered to be complete when the last group in the expanded instruction completes. When group completion occurs, all of the micro-ops in the group complete simultaneously, after all of the micro-ops have finished execution. Because the target scratch register has been marked by the IDU as not being used outside the group, no entry is updated in the architected register mapper. The physical register can be de-allocated at group completion time, without the need to involve the architected register mapper (block 512). This is advantageous because group completion of groups early in an expansion can occur significantly before the last group in the expanded instruction completes.

Aspects of various embodiments are described herein with reference to flowchart illustrations and/or block diagrams of methods and apparatus (systems) according to various embodiments. It will be understood that each block of the flowchart illustrations and/or block diagrams, and combinations of blocks in the flowchart illustrations and/or block diagrams, can be implemented by computer-readable program instructions.

The flowchart and block diagrams in the Figures illustrate the architecture, functionality, and operation of possible implementations of systems and methods according to various embodiments of the present invention. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The descriptions presented herein are for purposes of illustration and description, but is not intended to be exhaustive or limited. Many modifications and variations will be apparent to those of ordinary skill in the art without departing from the scope and spirit of embodiments of the invention. The embodiments were chosen and described in order to best explain the principles of operation and the practical application, and to enable others of ordinary skill in the art to understand embodiments of the present invention for various embodiments with various modifications as are suited to the particular use contemplated.

What is claimed is:

1. A method for handling cracked instructions in a processor, the method comprising:
    receiving a cracked instruction in an instruction dispatch unit of the processor;
    decoding the cracked instruction into one or more groups of micro-operations;
    based on a determination that the one or more groups of micro-operations use a scratch register, determining if the scratch register is used in other groups of micro-operations; and
    based on a determination that the scratch register is not used in the other groups of micro-operations, allocating a physical register for use as the scratch register without creating a mapper entry for the scratch register.

2. The method of claim 1 further comprising:
    further decoding the cracked instruction into an additional group of micro-operations; and
    de-allocating the physical register after completion of the one or more groups of micro-operations, prior to completion of the additional group of micro-operations.

3. The method of claim 2 wherein de-allocating the physical register comprises allowing the physical register to be used by other instructions.

4. The method of claim 1 wherein the determination if the scratch register is used in other groups of micro-operations is made based on an opcode of the cracked instruction.

5. The method of claim 1 wherein the determination if the scratch register is used in other groups of micro-operations is made prior to decoding subsequent groups of the cracked instruction.

6. The method of claim 1 wherein the determination that the scratch register is not used in other groups of micro-operations is performed by a mapper.

7. A processor comprising:
    a dispatch unit from which instructions are dispatched;
    instruction processing circuitry;
    a plurality of physical register files; and
    a mapper;
    the dispatch unit configured to:
        receive a cracked instruction;
        decode the cracked instruction into one or more groups of micro-operations;
        based on a determination that the one or more groups of micro-operations use a scratch register, determine if the scratch register is used in other groups of micro-operations; and
        based on a determination that the scratch register is not used in the other groups of micro-operations, allocate a physical register for use as the scratch register without creating a mapper entry for the scratch register.

8. The processor of claim 7 wherein the dispatch unit is further configured to:
    further decode the cracked instruction into an additional group of micro-operations; and
    de-allocate the physical register after completion of the one or more groups of micro-operations, prior to completion of the additional group of micro-operations.

9. The processor of claim 8 wherein de-allocating the physical register comprises allowing the physical register to be used by other instructions.

10. The processor of claim 7 wherein the determination if the scratch register is used in other groups of micro-operations is made based on an opcode of the cracked instruction.

11. The processor of claim 7 wherein the determination if the scratch register is used in other groups of micro-operations is made prior to decoding subsequent groups of the cracked instruction.

12. A method for handling scratch registers in a processor, the method comprising:
- receiving one or more groups of micro-operations in an instruction dispatch unit of the processor, wherein the one or more groups of micro-operations comprise an instruction expanded into additional one or more groups of micro-operations;
- based on a determination that the additional one or more groups of micro-operations use a scratch register, determining if the scratch register is used in other groups of micro-operations; and
- based on a determination that the scratch register is not used in the other groups of micro-operations, allocating a physical register for use as the scratch register without creating a mapper entry for the scratch register.

13. The method of claim 12 further comprising:
de-allocating the physical register after completion of the additional one or more groups of micro-operations.

14. The method of claim 13 wherein de-allocating the physical register comprises allowing the physical register to be used by other instructions.

15. The method of claim 12 wherein the determination if the scratch register is used in the other groups of micro-operations is made based on an opcode of the instruction expanded into the additional one or more groups of micro-operations.

16. The method of claim 12 wherein the determination if the scratch register is used in the other groups of micro-operations is made prior to decoding subsequent groups of micro-operations.

17. The method of claim 12 wherein the determination that the scratch register is not used in the other groups of micro-operations is performed by a mapper.

* * * * *